(12) United States Patent
Thimirachandra et al.

(10) Patent No.: US 9,696,831 B2
(45) Date of Patent: Jul. 4, 2017

(54) TOUCH SENSOR AND METHOD FOR DETECTING TOUCH INPUT

(71) Applicant: SYMBOL TECHNOLOGIES, INC., Schaumburg, IL (US)

(72) Inventors: Sanjeewa Thimirachandra, Kotugoda (LK); Ruwan Jayanetti, Nugegoda (LK); Anuradha Nirmala Nanayakkara, Telijjawila (LK)

(73) Assignee: Symbol Technologies, LLC, Holtsville, NY (US)

( * ) Notice: Subject to any disclaimer, the term of this patent is extended or adjusted under 35 U.S.C. 154(b) by 113 days.

(21) Appl. No.: 14/497,838

(22) Filed: Sep. 26, 2014

(65) Prior Publication Data

US 2016/0091995 A1    Mar. 31, 2016

(51) Int. Cl.
*G06F 3/041* (2006.01)

(52) U.S. Cl.
CPC ............ *G06F 3/041* (2013.01); *G06F 3/0416* (2013.01)

(58) Field of Classification Search
CPC .................. G06F 3/044; G06F 3/0418; G06F 2203/04104; G06F 3/041; G06F 3/0412; G06F 3/045; G06F 2203/04107; G06F 3/0416; G06F 3/0414
See application file for complete search history.

(56) References Cited

U.S. PATENT DOCUMENTS

| | | | |
|---|---|---|---|
| 8,350,819 B2 | 1/2013 | Chang et al. | |
| 8,390,596 B2 | 3/2013 | Tada | |
| 8,427,442 B2 | 4/2013 | Chang et al. | |
| 8,427,444 B2 | 4/2013 | Wu et al. | |
| 8,446,387 B2 | 5/2013 | Hsu et al. | |
| 8,525,799 B1 | 9/2013 | Grivna et al. | |
| 8,564,546 B1 | 10/2013 | Birch | |
| 2009/0146970 A1 | 6/2009 | Lowless et al. | |
| 2010/0321337 A1 | 12/2010 | Liao et al. | |
| 2011/0063249 A1 | 3/2011 | Chou et al. | |
| 2011/0080371 A1 | 4/2011 | Kao et al. | |
| 2011/0175825 A1 | 7/2011 | Chen et al. | |
| 2012/0062474 A1 | 3/2012 | Weishaupt et al. | |
| 2012/0146944 A1 | 6/2012 | Lee et al. | |
| 2012/0194471 A1 | 8/2012 | Park et al. | |

(Continued)

FOREIGN PATENT DOCUMENTS

| | | |
|---|---|---|
| CA | 2792590 A1 | 4/2013 |
| EP | 2612225 A2 | 7/2013 |

(Continued)

*Primary Examiner* — Gerald Johnson

(57) ABSTRACT

A method and apparatus for detecting touch input at a touch sensor is provided. The touch sensor comprises a plurality of row traces, a plurality of column traces and an intersection corresponding to an identified row trace of the plurality of row traces and an identified column trace of the plurality of column traces. The touch sensor also includes at least one driver for driving the plurality of column traces and at least one reader for reading the plurality of row traces. The drivers and the readers scan the identified intersection by entering into a with-floating scan state, reading a first value for the identified row trace, entering into a without-floating scan state and reading a second value for the identified row trace. The presence of a touch input is accordingly determined based on the first and second values.

15 Claims, 8 Drawing Sheets

(56) References Cited

U.S. PATENT DOCUMENTS

| | | | |
|---|---|---|---|
| 2012/0194476 A1 | 8/2012 | Lee et al. | |
| 2012/0212446 A1 | 8/2012 | Wu | |
| 2012/0293455 A1* | 11/2012 | Shen | G06F 3/044 345/174 |
| 2013/0027348 A1 | 1/2013 | Oh et al. | |
| 2013/0057510 A1 | 3/2013 | Kern | |
| 2013/0207907 A1 | 8/2013 | Chao et al. | |
| 2014/0015774 A1* | 1/2014 | Bussat | G06F 3/0418 345/173 |
| 2014/0049494 A1 | 2/2014 | Niu et al. | |
| 2015/0091820 A1* | 4/2015 | Rosenberg | G06F 3/0414 345/173 |
| 2015/0177898 A1* | 6/2015 | Hirata | G06F 3/0414 345/173 |

FOREIGN PATENT DOCUMENTS

| | | |
|---|---|---|
| EP | 2616912 A1 | 7/2013 |
| EP | 2270637 B1 | 11/2013 |
| JP | 2011138469 A | 7/2011 |
| JP | 2013508800 A | 3/2013 |
| WO | 2010085686 A1 | 7/2010 |
| WO | 2009137355 A3 | 10/2010 |

* cited by examiner

TOUCH SENSOR AND METHOD FOR DETECTING TOUCH INPUT

BACKGROUND OF THE INVENTION

Touch sensors provide an input mechanism for a device through tactile or haptic means, such as for example, by touching a sensor located within the device. Different types of touch sensors may require touch input to be provided by different materials. For example, capacitive touch sensors are typically responsive to a touch by a body part, such as a finger or a conductive stylus specifically designed for capacitive sensors. Resistive touch sensors are responsive to pressure provided by relatively rigid materials that are able to depress the touch surface with sufficient force.

As an input to a device, touch sensors typically provide an indication of touch location. One issue for touch sensors is a problem referred to as "ghost inputs". Ghost inputs occur when a touch input is detected at a location that is not actually receiving a touch input. Accordingly, it is desirable to provide a mechanism for touch input detection that identifies and excludes ghost inputs. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
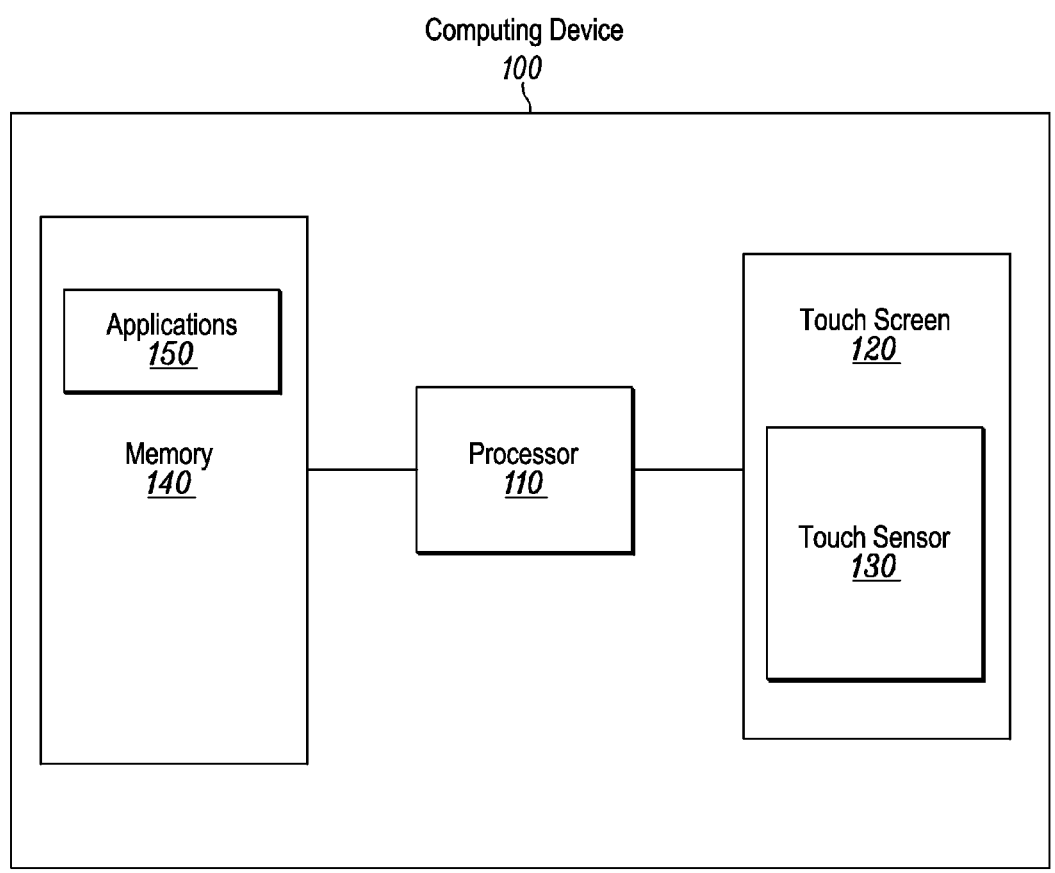
FIG. 1 is a block diagram of a computing device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method of detecting touch location at a touch sensor is provided. The touch sensor comprises a plurality of row traces, a plurality of column traces and an intersection corresponding to an identified row trace of the plurality of row traces and an identified column trace of the plurality of column traces. The touch sensor also includes at least one driver for driving the plurality of column traces and at least one reader for reading the plurality of row traces. The drivers and the readers scan the identified intersection by entering into a with-floating scan state, reading a first value for the identified row trace, entering into a without-floating scan state and reading a second value for the identified row trace. The presence of a touch input can accordingly be determined based on the first and second values.

FIG. 1 is a block diagram of a computing device 100 in which methods and components required for performing a method of detecting touch input at a touch sensor is implemented in accordance with the embodiments. The computing device 100 may take form of, but is not limited to, a wearable device such as wrist mounted device, a vehicle mounted device, a handheld device such as a smartphone, a tablet, a bar code scanner, optical code reader and the like, a data capture terminal connected to a handheld device, a desktop, a vehicle mounted device, a laptop or notebook computer, an automated teller machine, a kiosk, a vending machine, a payment machine, facsimile machine, a point of sale device and the like.

The processor 110 runs or executes operating instructions or applications that are stored in the memory 140 to perform various functions for the computing device 100 and to process data. The processor 110 includes one or more microprocessors, microcontrollers, digital signal processors (DSP), state machines, logic circuitry, or any device or devices that process information based on operational or programming instructions stored in the memory 140. In accordance with the embodiments, the processor 110 processes various functions and data associated with carrying out functions of the computing device 100.

The memory 140 is any apparatus or non-transitory medium capable of storing digital information. Accordingly, the memory 140 may be an IC (integrated circuit) memory chip containing any form of RAM (random-access memory) or ROM (read-only memory), a CD-RW (compact disk with read write), a hard disk drive, a DVD-RW (digital versatile disc with read write), a flash memory card, external subscriber identity module (SIM) card or any other non-transitory medium for storing digital information. The memory 140 comprises applications 150. The applications 150 include various software and/or firmware programs necessary for the operation of the device 100 as well as software and/or firmware programs (e.g. warehouse management, email applications etc.) that address specific requirements of one or more device users.

The touch screen 120 may be realized as an electronic display configured to graphically display information and/or content under the control of the processor 110. Depending on the implementation of the embodiment, the touch screen 120 may be realized as a liquid crystal display (LCD), a touch-sensitive display, a cathode ray tube (CRT), a light emitting diode (LED) display, an organic light emitting diode (OLED) display, a plasma display, a projection display, or another suitable electronic display. The touch screen 120 may provide a user interface between the computing device 100 and a user.

The touch screen 120 further includes a touch sensor 130 to form a touch layer. The touch sensor 130 provides a user interface, for example an input interface that complements an output interface provided by the display portions of the touch screen 120. The touch sensor 130 may have a touch-sensitive surface, sensor, or set of sensors that accepts input from the user based on haptic and/or tactile contact. The touch sensor 130 is operated by an input device (such as a finger of a user or other input device such as a stylus) to provide touch sensitive inputs to the device 100. Although the block diagram of FIG. 1 shows touch sensor 130 to be an integral part of the touch screen 120, in some embodiments, the device 100 may include a display that is separate from the touch sensor 130. In further embodiments, a touch sensor 130 may exist even when the computing device 100 does not include a display. In yet other embodiments, there may be more than one touch sensor 130. In general, the term "touch sensor" will be used throughout the description to represent any touch sensitive sensor or panel.

Figure 2:
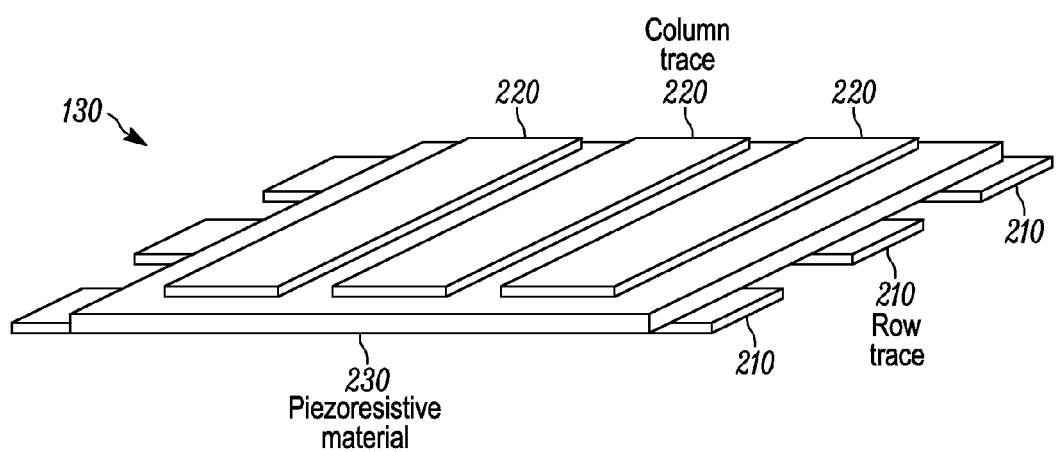
FIG. 2 is a block diagram of a touch sensor in accordance with some embodiments.

As an illustrative example, the touch sensor 130 may be formed on a transparent substrate, comprising glass or a polymer, for example. Referring to FIG. 2, a layer of first patterned conductive traces 210 (hereinafter row traces 210) may be deposited over the substrate (not shown). A layer of second patterned conductive traces 220 (hereinafter column traces 220) may be deposited over the layer of first patterned conductive traces to form a matrix of addressable intersections. Drive and read signals are sent and received through tab connectors (not shown) attached to each of the column traces 220 and the row traces 210. A piezoresistive material 230 is deposited between the row traces 210 and the column traces 220. The piezoresistive material 230 may be a continuous layer as shown in FIG. 2 or may be patterned to be positioned only at the intersections. Although in this illustrative example, three column traces 220 and three row traces 210 are shown, it will be appreciated by those of skill in the art that in variations, any desired number of the column traces 220 and the row traces 210 may be used.

The resistance at each addressable intersection is controlled by the pressure applied at that intersection. Current flows through the piezoresistive material 230 and through a conductive path formed by, for example, conductive particles contained within the piezoresistive material 230. When pressure is applied to the piezoresistive material 230, it deforms and shortens the conductive path of current flow, thus lowering the resistance.

By driving and reading the column traces 220 and the row traces 210 of the patterned conductive traces and mapping the resistance of the piezoresistive material 230 at each intersection, a corresponding pressure map of the touch screen 130 may be obtained. This map provides both the position and the force of the corresponding touch inputs.

Figure 3:
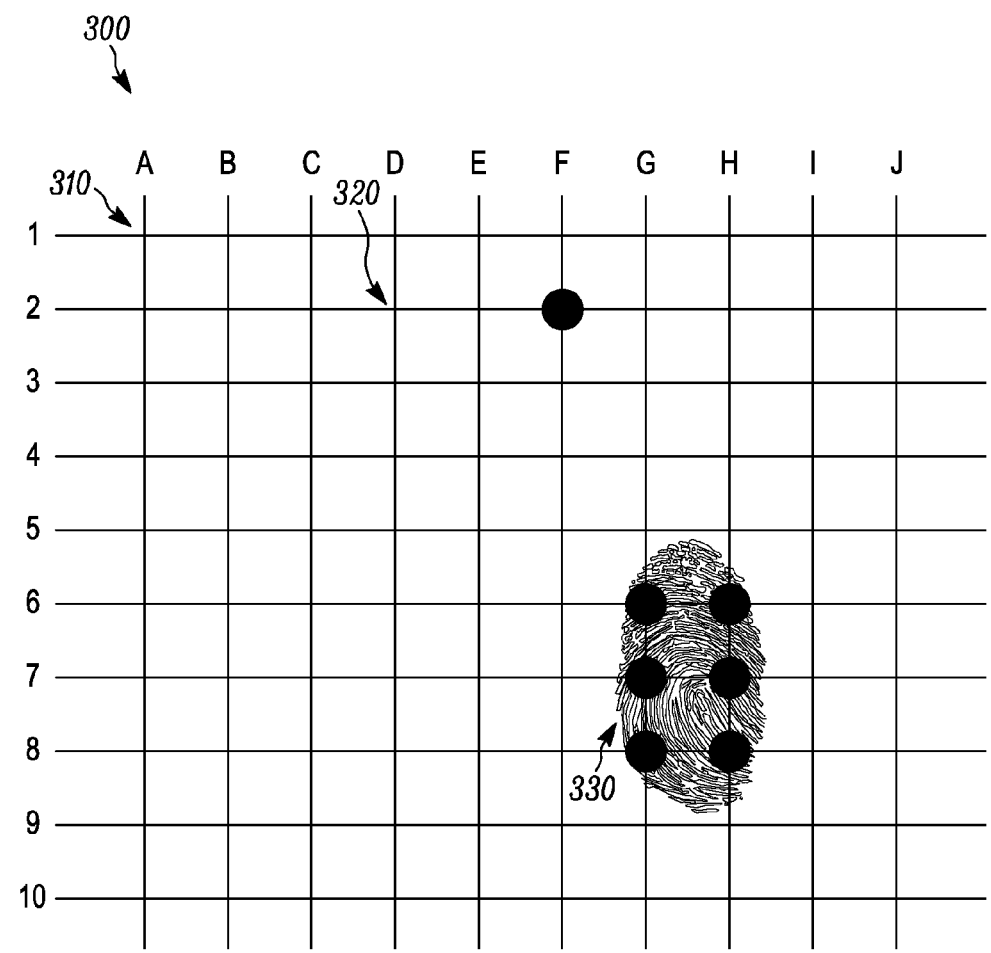
FIG. 3 is a schematic of a touch sensor in accordance with some embodiments.

Referring to FIG. 3, ten column traces 220 and ten row traces 210, which form the touch sensor 130 in accordance with another example, are shown in a schematic diagram as matrix 300. Each column trace 220 is labelled with a letter of the alphabet ranging from A to J, and referred to as the columns A to J, whereas each row trace 210 is labelled with a number ranging from 1 to 10, and is referred to as the rows 1 to 10. Accordingly, each intersection where the column traces 220 and the row traces 210 overlap may be identified uniquely with a combination of a letter and a number, which, in this illustrative example is the address of that intersection. Accordingly, the intersection 310 has an address of A1, whereas the intersection 320 has an address of D2. It will be appreciated by those of skill in the art that the addressing mechanism used here is chosen to simplify illustrating touch points graphically in the figures, and that in various implementations, different addressing mechanisms may be used to address actual touch points. Moreover, although in this illustrative example ten column traces 220 and ten row traces 210 are shown, it will also be appreciated by those of skill in the art that in variations, any desired number of column traces 220 and row traces 210 may be used.

In the illustrative example of FIG. 3, the piezoresistive material 230 (not shown) has a resistance of a few mega ohms when no pressure is applied. Accordingly, when the resistance is measured across an intersection where there is no touch input being provided; the value obtained is in the order of a few mega ohms. On the other hand, when sufficient pressure is applied to compress the piezoresistive material 230 fully, the piezoresistive material 230 has a resistance in the order of a few kilo ohms. Accordingly, when the resistance is measured across an intersection where a full touch input is being received, fully compressing the piezoresistive material 230, the value obtained is in the order of a few kilo ohms. When the piezoresistive material 230 is depressed partially, the measured resistance at the corresponding intersection is typically in between a few kilo ohms and a few mega ohms.

As a simplified illustration of touch location detection, to detect a touch at an intersection, the column trace 220 corresponding to that intersection is driven and a current (or voltage) is applied. As well, the row trace 210 corresponding to the intersection is read. The resulting current (or voltage) value read depends on the state of compression of the piezoresistive material 230. For example, when there is no touch input at the intersection such that the piezoelectric material 230 is not compressed, a minimal amount of current will be detected. Alternatively, when there is a full touch at the intersection such that the piezoelectric material 230 is fully compressed, a maximum amount of current will be detected. Accordingly, a threshold current level that is between the minimal and the maximum values may be identified, and a touch input may be considered to be detected when the current value read at an intersection is determined to be above the threshold, indicating sufficient pressure is applied at that intersection to be deemed as a touch input.

To detect a touch input, different scan mechanisms may be used to drive the intersections. For example, to detect touch at the matrix 300, the column traces 210 may be driven by column drivers such a tri-state general purpose input output (GPIOs) sources having the states of high, low and floating. The GPIO sources may be, for example, supplied as a component of a driver integrated chip package. The three states may fall within two modes, input mode and output mode. For example, high and low states may be achieved when a GPIO source is set to the output mode. On the other hand, the floating state may be achievable when a GPIO source is set to the input mode. In some variations, when the GPIO sources are set to the output mode, the mode may be specified to be of the push-pull type, which can provide or sink higher currents in comparison to other types.

Figure 4:
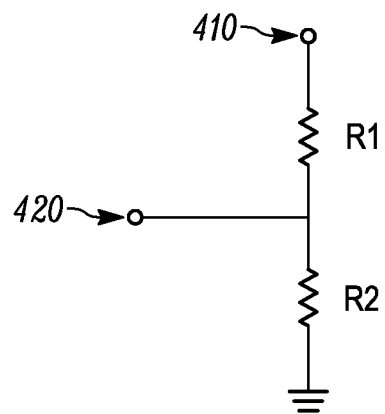
FIG. 4 is a schematic of a touch sensor in use in accordance with some embodiments.

The sensing or reading of the rows may be performed with a multiple of analog to digital converters (ADCs) or with a single ADC along with analog multiplexers. For example, referring to FIG. 4, one simplified example implementation is shown for reading touch at an intersection. The drive voltage is provided at 410 by a column driver (not shown). The resistor R1 corresponds to the resistance on the touch pad formed due to a touch input. The resistor R2 is a known resistance either placed externally or using the GPIO pull-down capability of a GPIO source used to read the ADC through the connection 420. Since the resistance R2 is a known value, the ADC reading can be used to calculate the actual current flow and thus, where appropriate, the resistance of the resistor R1. Based on the current or the resistance value obtained, a determination can be made regarding the presence or absence of a touch input at that intersection as explained above. It is to be understood by people of skill that in other implementations other mechanisms can be used to read or sense touch such as a direct current sensing mechanisms.

Continuing with FIG. 3, a filled circle is used to indicate a touch input that is applied with sufficient pressure to be detected as a touch input. Accordingly, a touch input is indicated at intersection F2. A touch input involving only one intersection is typically provided by a pointy object, such as a stylus with a sharp tip. Alternatively, when the touch input is provided by blunt objects, multiple adjacent intersection may be affected, as indicated at 330.

Figure 5:
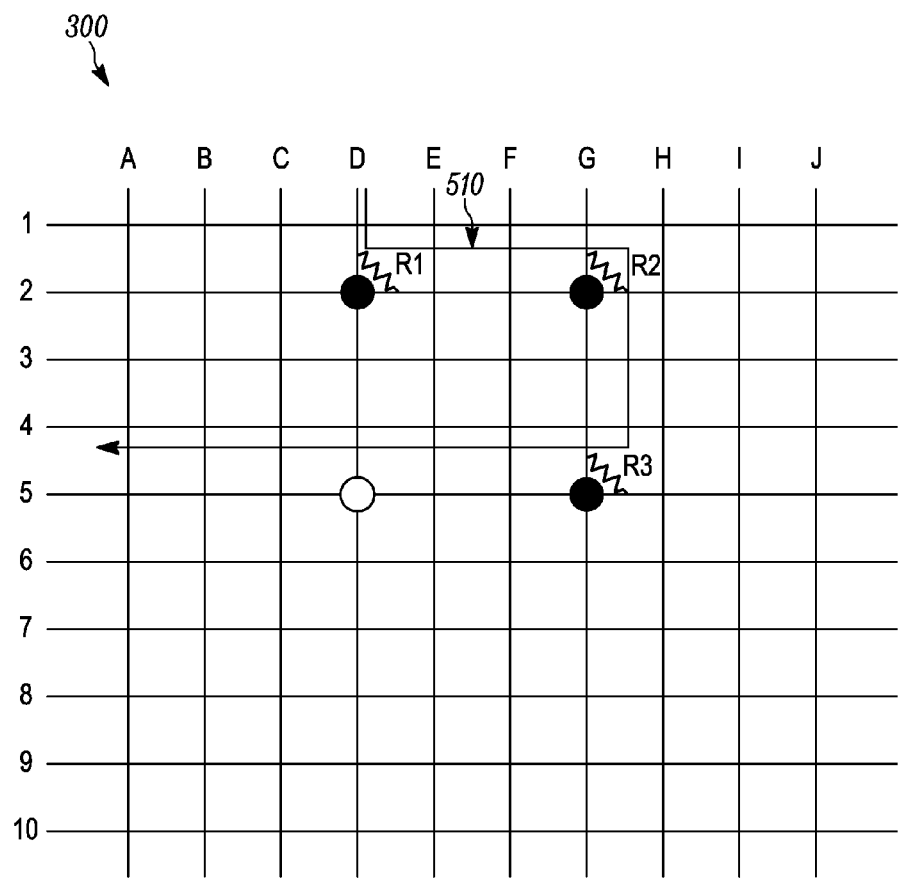
FIG. 5 is a schematic of a touch sensor in use in accordance with some embodiments.
Figure 6:
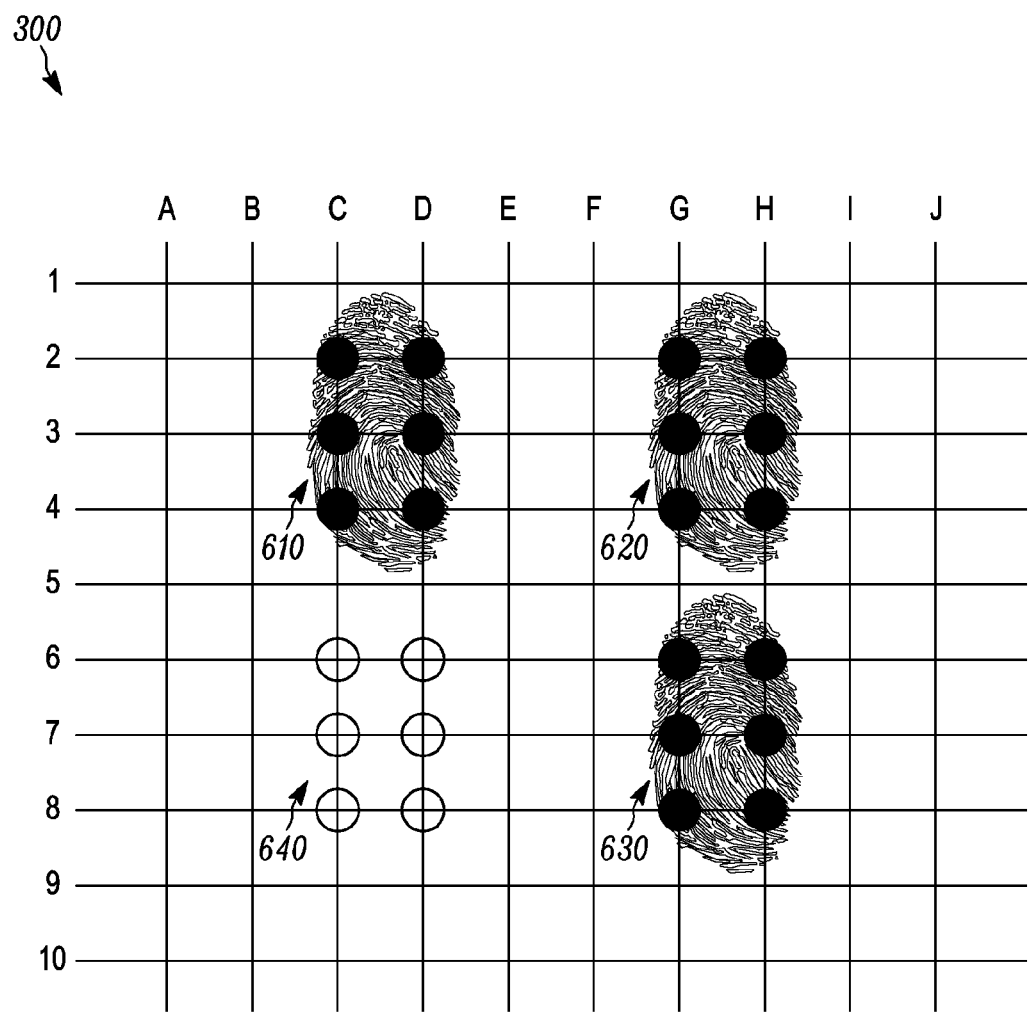
FIG. 6 is a flowchart of a method of detecting touch input using a touch sensor of FIG. 2 in use in accordance with some embodiments.

The touch sensor 130 is also multi-touch capable, meaning multiple touch inputs may be detected simultaneously at various distinct locations on the touch sensor 130. Accordingly, when multiple objects are simultaneously placed on the touch sensor 130 with sufficient force, each individual object's position may be distinguished. For example, referring to FIG. 5, multiple simultaneous touch inputs are shown at the intersections D2, G2 and G5 that are being provided by sharp point styli. FIG. 6, on the other hand shows, at 610, 620 and 630, multiple simultaneous touch inputs that are being provided by multiple blunt object such as multiple fingers.

Returning to FIG. 2, when detecting touch input locations at the touch sensor 130, some intersections may be detected as receiving touch inputs, even though touch inputs are not actually provided at those intersections. Such phantom touch inputs are generally known as ghost inputs. Typically, ghost inputs are detected due to the creation of current paths from other simultaneous touch inputs provided at different locations. For example, in some implementations, touch inputs may be provided such that current may be diverted from the column trace 220 being driven, through a row trace 210 that is not read, to another column trace 220 that is not driven. The diverted current may then flow from non-driven column trace 220 to the row trace 210 that is being read.

Referring back to FIG. 5, an example ghost input is shown at the intersection D5 as an unfilled circle. In FIG. 5, there are three intersections which are actually receiving simultaneous touch inputs, as indicated at D2, G2, and G5. There is no actual touch input being provided at the intersection D5. However, when the column D is driven and the row 5 read, a current value is actually detected for the intersection D5 indicative of a touch input. A current value is detected due to the diverted current made possible by the actual touch inputs provided at the same time the intersection D5 is scanned. The path of the diverted current is indicated at 410. Specifically, resistances R1, R2 and R3 are formed at the three touch points due to the applied pressure at those intersections. Accordingly, when the column D is driven, the current is diverted from the column D to the row 2 via R1, then from the row 2 to the column G via R2 and finally from the column G to the row 5 via R3. Thus, when the row 5 is read, a current value is detected indicative of a touch input being received (for example above a predetermined threshold), even though, in actuality, there is no touch input being provided at that intersection. The ghost inputs may also be detected when multiple touches are provided by blunt objects, as shown at 640 in FIG. 6.

In some variations, the manner in which the column traces 220 and the row traces 210 of the touch sensor 130 are driven and read (i.e. scanned) may be altered to reduce or eliminate the detection of ghost inputs. For example, all of the column driving GPIOs may be set to the output mode of push-pull type, enabling the columns to be driven strongly at either logic high or logic low states.

When the GPIO mode is the output mode, a GPIO source may be set to a logic high. When set to a logic high, the measured voltage at the GPIO source is similar to the applied supply voltage, for example for the chip including the GPIO, such as 5 volts. Accordingly, in this mode, the GPIO source can drive a column high, becoming a potential voltage source to the column thus enabling a current flow when there is an appropriate path to supply ground (for example zero volts) formed by, for example, pressing an appropriate intersection of the touch sensor 130. Accordingly, a GPIO source that is set at a high logic state can supply current to a column it is driving.

When the GPIO mode is the output mode, a GPIO source may alternatively be set to a logic low. When set to a logic low, the measured voltage at the GPIO source is near zero, similar to a supply ground. Accordingly, in this mode, the GPIO source can drive a column low, becoming a potential current sink. Thus, when a connection is made from a supply line, for example, from another column that is driven high, to a column driven low, the column driven low acts as a sink for the current supplied.

When the GPIO mode is the input mode, a GPIO source may be further set to a logic floating (high impedance) state. The logic floating state is a state where there is no connection to any supply lines. Accordingly, it is similar to a fully isolated state. It cannot provide a voltage. Accordingly, in this mode, the GPIO source can neither drive a column high nor low. Thus, it is neither a current sink nor a current supplier. When the voltage of a floating state GPIO is measured, typically a random value is obtained caused by environment noise.

To detect a touch input at an intersection, a scan state of without-floating is entered by setting the intersection's corresponding column driver to a logic high state while setting all the other column drivers to a logic low state. Accordingly, the column corresponding to the intersection being scanned is set as a current supply, while all the other columns are set as current sinks. The without-floating scan state allows the detection of current values at intersections that are actually receiving touch input. Where the intersection is receiving a touch input, the current supplied by the corresponding column trace 220 travels to the intersection's corresponding row trace 210 and is read by an ADC. The detected current values, may, however, be lowered, when there are simultaneous touch inputs being provided to other intersections along the same row as the intersection being scanned. Such simultaneous touch inputs may enable the current to travel to the column traces 220 with drivers set at a logic low state. Those column traces 220 with the drivers set at a logic low state may hence act as a sink for the current, thus reducing the current value being read at the intersection.

When intersections are scanned at the without-floating scan state, in addition to being able to detect actual touch inputs, the detection of ghost inputs may also be reduced. For example, since all column traces 220, other than the column trace 220 corresponding to the intersection being detected, are driven at a logic low state, they serve as current sinks. Accordingly, the supplied current at the column trace 220 being scanned may not be diverted through the columns traces 220 that are not being scanned.

A second scan state, with-floating scan state, may also be used to scan an intersection. A scan at the with-floating scan state is performed by setting the intersection's corresponding column driver at a logic high state while setting all other column drivers at a logic floating state and reading the appropriate row trace 210. At intersections receiving an actual touch input, the current values are read at the expected levels regardless of whether there are other simultaneous touch inputs being provided. This is because none of the column traces 220 may serve as current sinks or suppliers when their drivers are set in the logic floating state. Thus, at intersections where there is no actual touch input being provided, current values may be detected when a combination of simultaneous touch points exist that would lead to a ghost input detection as described above.

Following the scanning of an intersection using the two scan states, the combined current values detected may be used to distinguish between actual and ghost inputs. At an intersection receiving an actual touch input, current values indicating touch input is detected at both scan states. On the other hand, at an intersection that is not actually receiving a touch input, either no current value will be detected at either scan state or, where the detection of ghost inputs are made possible by the presence of simultaneous touch inputs, a current value indicating a touch input may be detected only at the with-floating scan state. Accordingly, ghost inputs may be distinguished from actual touch inputs.

Figure 7:
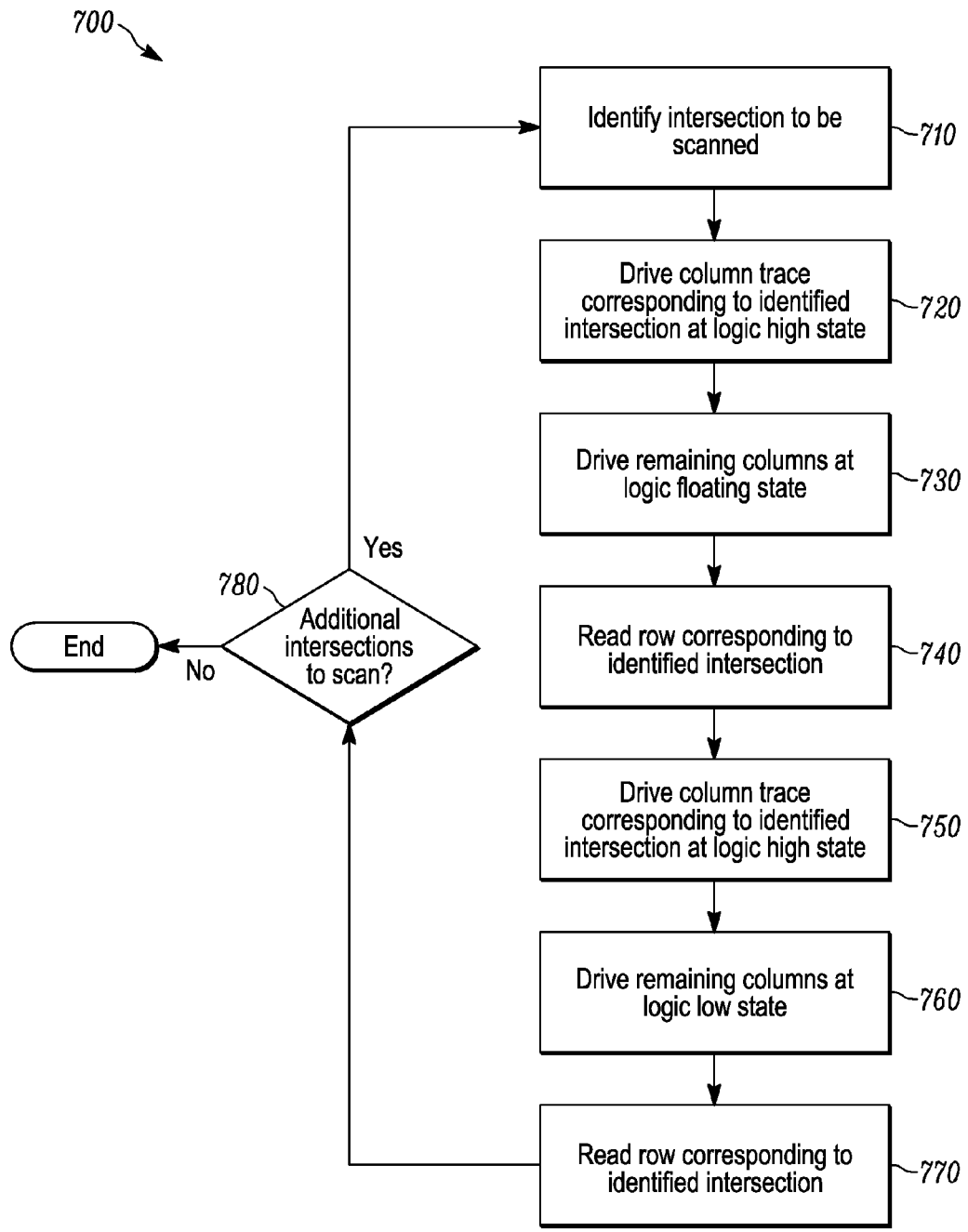
FIG. 7 is a schematic of a touch sensor in use in accordance with some embodiments.
Figure 8:
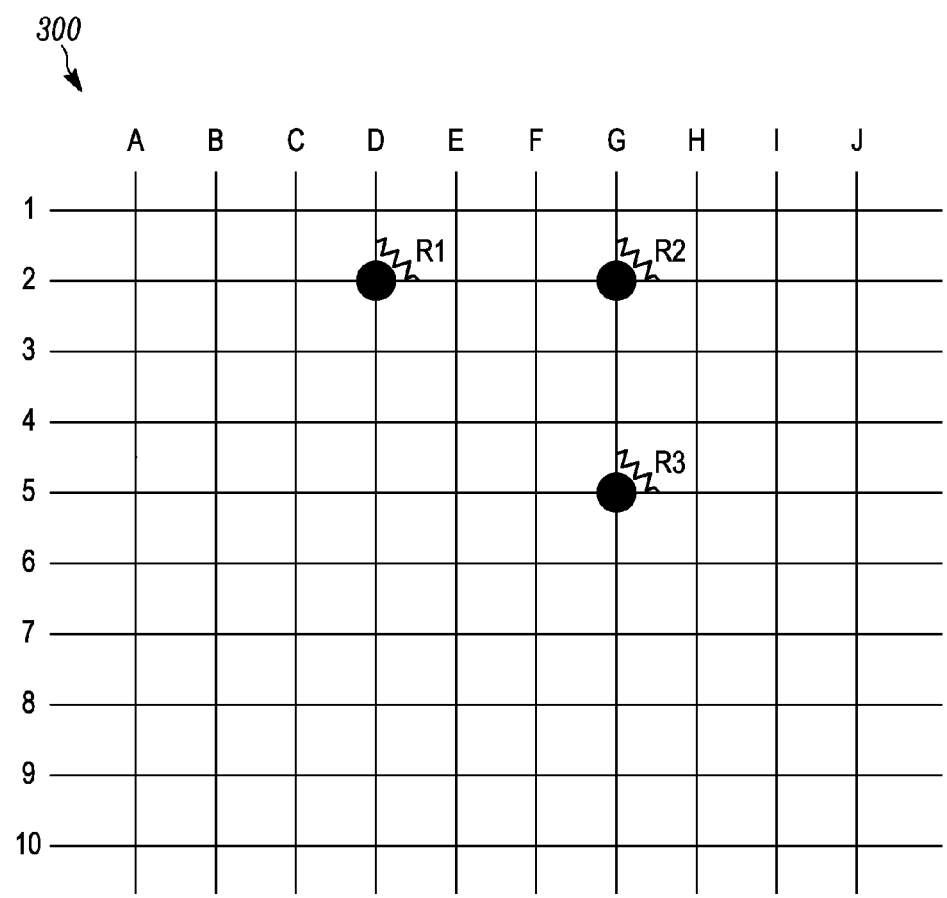
FIG. 8 is a schematic of a touch sensor in use in accordance with some embodiments.

FIG. 7 represents a flowchart of a method 700 for detecting touch input at a touch sensor of FIG. 1 in accordance with some embodiments. As shown in FIG. 7, the method 700 begins at 710 by identifying an intersection to be scanned, for example by determining an address of that intersection. Referring to FIG. 8, in this example, the address of the intersection to be scanned is D2, which, as shown, is receiving a touch input. Moreover, all of the column driving GPIOs are set to the output mode of push-pull type. Additional simultaneous touch inputs are also being provided as indicated at the intersections G2 and G5.

Blocks 720 and 730 allow entering a scan state referred to as the with-floating scan state. Accordingly, at 720, the column trace 220 corresponding to the identified intersection is driven to a high logic state, and at 730, the remaining drivers for the remaining column traces 220s are set to a logic floating state. Accordingly, in this example, the column drivers other than the one corresponding to the identified intersection are set at logic floating (high impedance) state and will neither sink nor supply current.

Continuing with the method 700, at 740 a row trace 210 corresponding to the identified intersection, in this example of FIG. 8, the row 2, is read, for example using an ADC or an ADC along with an analog multiplexer. Accordingly, a current value is obtained for the identified intersection corresponding to the floating driver state. In this example, since there is an actual touch input being provided at the intersection D2, a current value corresponding to a touch input is detected. For example, the current value may be above a predetermined threshold for detecting a touch input.

Continuing with the method 700, the scan state is changed to without-floating based on the blocks 750 and 760. At 750, the column trace 220 corresponding to the identified intersection is continued to be driven at a logic high state. At 760, however, the remaining column traces 220 are driven at a logic low state. Accordingly, the column driver for the column D serves as a current supply, allowing current to flow, whereas the remaining column drivers serve as current sinks.

At 770 the row trace 210 corresponding to the identified intersection is once again read. Accordingly, a second current value is obtained for the identified intersection, corresponding to the without-floating scan state. Since there is an actual touch input being provided at the intersection D2, a current value corresponding to a touch input will thus be detected. However, current value may actually be lower than the value obtained at block 740 since the column G is now driven at a logic low state acting as a current sink, and thus potentially diverting at least some of the current that would have otherwise been detected when the row trace 210 corresponding to row 2 is read.

Continuing with the method 700, at 780, a determination is made as to whether additional intersections need to be scanned. If not, the method 700 ends at 790. If so, the method continues at 710. In order to illustrate the detection of touch inputs at an intersection where a ghost input may be detected, the method 700 is continued for the intersection D5. Accordingly, the method 700 begins at 710 by identifying the intersection D5 to be scanned, which, as shown, is not receiving a touch input. Moreover, all of the column driving GPIOs are set to the output mode of push-pull type. Additional simultaneous touch inputs are also being provided as indicated at the intersections D2, G2 and G5 of FIG. 8.

Blocks 720 and 730 allow entering a scan state referred to as the with-floating scan state. Accordingly, at 720, the column trace 220 corresponding to the identified intersection is driven to a high logic state, and at 730, the remaining drivers for the remaining column traces 220s are set to a logic floating state. Accordingly, in this example, the column drivers other than the one corresponding to the identified intersection are set at a logic floating state (high impedance) and will neither sink nor supply current.

Continuing with the method 700, at 740 a row trace 210 corresponding to the identified intersection, in this example of FIG. 8, the row 5, is read, for example using an ADC or an ADC along with an analog multiplexer. Accordingly, a current value is obtained for the identified intersection corresponding to the floating scan state. In this example, even though there is no actual touch input being provided at the intersection D5, a current value is detected, for example above a threshold corresponding to a touch input. For example, current may be diverted by R1, R2 and R3 as shown in FIG. 5.

Continuing with the method 700, the scan state is changed to without-floating based on the blocks 750 and 760. At 750, the column trace 220 corresponding to the identified intersection is continued to be driven at a logic high state. At 760, however, the remaining column traces 220 are driven at a logic low state. Accordingly, the column driver for the column D serves as a current supply, allowing current to flow, whereas the remaining column drivers serve as current sinks.

At 770 the row trace 210 corresponding to the identified intersection is once again read. Accordingly, a second current value is obtained for the identified intersection, corresponding to the without-floating scan state. In this example, since there is no actual touch input being provided at the intersection D5, a minimal current value is detected, indicating no touch input. For example, any current diverted by R1 and R2 is sunk by the column G since the column G is driven at a low logic state. Accordingly, the second value obtained is near zero or below the threshold for detecting a touch input.

In variations of method 700, without-floating scan state may be entered for an intersection when a current value indicating a touch input is read affirmatively at block 740. Accordingly, when a current value below a threshold for detecting a touch input is read at block 740, blocks 750 through 770 may be skipped to increase touch detection performance and reduce power consumption, for example.

It is to be noted that alternative driving sequences may be used to minimize power and enable fast operation. For example, since the touch sensor 130 remains idle most of time, and even when a touch input happens, most of the intersections of the touch sensor 130 are actually not receiving a touch input, a row scanning method may be used whereby all columns are driven at once, Accordingly, the value read is related to that entire row. When the value read indicates a row touch input for the row, then the scan is performed intersection by intersection as per method 700, for example. Alternatively, when the scan of a row produces a negative result (namely no row input is detected), the scan of those intersections corresponding to that row may be omitted.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of detecting touch input at a touch sensor comprising a plurality of column traces and a plurality of row traces, the method comprising:
   entering into a with-floating scan state;
   reading a first value for an identified row trace of the plurality of row traces corresponding to an intersection;
   determining whether the first value read in the with-floating scan state is one of above and below a first threshold;
   when the first value is below the first threshold, determining no touch input has occurred at the intersection; and,
   when the first value is above the first threshold:
      entering into a without-floating scan state;
      reading a second value for the identified row trace; and
      determining a presence of the touch input at the intersection based on the first value and the second value.

2. The method of claim 1 wherein the determining the presence of the touch input based on the first value and the second value produces an affirmative result when the first value and the second value are above the first threshold.

3. The method of claim 1 wherein entering the with-floating scan state further comprises:
  driving an identified column trace of the plurality of column traces corresponding to the intersection at a logic high state; and
  driving the plurality of column traces other than the identified column trace corresponding to the intersection at a logic floating state.

4. The method of claim 1 wherein entering the without-floating driver state further comprises:
  driving an identified column trace of the plurality of column traces corresponding to the intersection at a logic high state; and
  driving the plurality of column traces other than the identified column trace corresponding to the intersection at a logic low state.

5. The method of claim 1 further comprising:
  at each scan state driving column traces by tri-state general purpose input output sources.

6. A touch sensor comprising:
  a plurality of row traces;
  a plurality of column traces;
  an identified intersection corresponding to an identified row trace of the plurality of row traces and an identified column trace of the plurality of column traces;
  at least one driver for driving the plurality of column traces;
  at least one reader for reading the plurality of row traces; and
  the at least one driver and the at least one reader scanning the identified intersection by:
    entering into a with-floating scan state;
    reading a first value for the identified row trace;
    determining whether the first value read in the with-floating scan state is one of above and below a first threshold;
    when the first value is below the first threshold, determining no touch input has occurred at the identified intersection; and,
    when the first value is above the first threshold:
      entering into a without-floating scan state;
      reading a second value for the identified row trace; and
      determining a presence of the touch input at the identified intersection based on the first value and the second value.

7. The touch sensor of claim 6 wherein entering the with-floating scan state further comprises:
  driving the identified column trace at a logic high state; and
  driving the plurality of column traces other than the identified column trace at a logic floating state.

8. The touch sensor of claim 6 wherein entering the without-floating driver state further comprises:
  driving the identified column trace at a logic high state; and
  driving the plurality of column traces other than the identified column trace at a logic low state.

9. The touch sensor of claim 6 wherein the driver further comprises tri-state general purpose input output sources for driving columns.

10. A method of detecting touch input at a touch sensor comprising a plurality of column traces and a plurality of row traces, the method comprising:
  scanning each intersection formed by a crossing of the plurality of column traces and the plurality of row traces, the scanning further comprising:
  entering into a with-floating scan state;
  reading a first value for an identified row trace of the plurality of row traces corresponding to the intersection;
  determining whether the first value read in the with-floating scan state is one of above and below a first threshold;
  when the first value is below the first threshold, determining no touch input has occurred at the intersection; and,
  when the first value is above the first threshold:
    entering into a without-floating scan state;
    reading a second value for the identified row trace; and
    determining a presence of the touch input at the intersection based on the first value and the second value.

11. The method of claim 10 wherein the determining the presence of the touch input based on the first value and the second value produces an affirmative result when the first value and the second value are above the first threshold.

12. The method of claim 10 wherein entering the with-floating scan state further comprises:
  driving an identified column trace of the plurality of column traces corresponding to the intersection at a logic high state; and
  driving the plurality of column traces other than the identified column trace corresponding to the intersection at a logic floating state.

13. The method of claim 10 wherein entering the without-floating driver state further comprises:
  driving an identified column trace of the plurality of column traces corresponding to the intersection at a logic high state; and
  driving the plurality of column traces other than the identified column trace corresponding to the intersection at a logic low state.

14. The method of claim 10 further comprising:
  at each scan state driving column traces by tri-state general purpose input output sources.

15. The method of claim 10 further comprising:
  prior to scanning the intersections formed by the crossing of the plurality of column traces and the plurality of row traces, scanning each row trace; and
  when the scanning of the row trace produces a negative result, omitting the scanning of the intersections corresponding to the row trace.

* * * * *